(12) United States Patent
Vedula et al.

(10) Patent No.: US 11,847,626 B2
(45) Date of Patent: *Dec. 19, 2023

(54) PLATFORM-AGNOSTIC ACCOUNT ACCESS USING FACIAL RECOGNITION

(71) Applicant: 365 Retail Markets, LLC, Troy, MI (US)

(72) Inventors: Krishna Vedula, Bloomfield, MI (US); Dennis Yee, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/705,364

(22) Filed: Mar. 27, 2022

(65) Prior Publication Data

US 2022/0215365 A1 Jul. 7, 2022

Related U.S. Application Data

(63) Continuation of application No. 16/712,023, filed on Dec. 12, 2019, now Pat. No. 11,288,646.

(60) Provisional application No. 62/778,557, filed on Dec. 12, 2018.

(51) Int. Cl.
*G06Q 20/18* (2012.01)
*G06Q 20/40* (2012.01)

(52) U.S. Cl.
CPC ......... *G06Q 20/18* (2013.01); *G06Q 20/4014* (2013.01)

(58) Field of Classification Search
CPC .. G06Q 20/18; G06Q 20/4014; G06Q 20/202; G06Q 20/40145; G06Q 20/20
USPC ......................................................... 705/16
See application file for complete search history.

(56) References Cited

U.S. PATENT DOCUMENTS

| 8,577,810 | B1 | 11/2013 | Dalit et al. | |
|---|---|---|---|---|
| 2013/0179281 | A1 | 7/2013 | White et al. | |
| 2016/0155127 | A1* | 6/2016 | Hartman | G06Q 20/18 705/18 |
| 2018/0114219 | A1* | 4/2018 | Setchell | H04L 9/3231 |
| 2019/0220583 | A1* | 7/2019 | Douglas | G06F 21/316 |

OTHER PUBLICATIONS

PCT/US2019/065934 International Preliminary Report on Patentability, dated Nov. 24, 2020.
PCT/US2019/065934 International Search Report and The Written Opinion, dated Mar. 25, 2020.

* cited by examiner

*Primary Examiner* — Garcia Ade
(74) *Attorney, Agent, or Firm* — Young Basile Hanlon & MacFarlane, P.C.

(57) ABSTRACT

Facial recognition is used to allow access to platform-agnostic account information. A processing and verification device receives a request for a transaction requiring access to account information of a user. Responsive to the request, a new image of the user is generated, such as using an image sensor of a camera. The new image is used to query a database to determine whether an existing image stored in the database matches or substantially matches the new image. Responsive to a positive result of the query, the request is allowed by the processing and verification device granting the access to the account information. The access to the account information is then used to complete the transaction. The account information uses a global architecture such that it can be used with different hardware and software configurations of a connected system.

20 Claims, 6 Drawing Sheets

PLATFORM-AGNOSTIC ACCOUNT ACCESS USING FACIAL RECOGNITION

CROSS-REFERENCE TO RELATED APPLICATION(S)

This disclosure is a continuation of U.S. application Ser. No. 16/712,023, filed Dec. 12, 2019, which claims the benefit of U.S. Provisional Application No. 62/778,557, filed Dec. 12, 2018, the disclosures of which are hereby incorporated by reference in their entirety.

TECHNICAL FIELD

This disclosure relates to a platform-agnostic account access using facial recognition.

BACKGROUND

Connected systems are used to facilitate transactions, such as by transmitting, receiving, and processing requests. In one example, a connected system can include devices within a self-service market environment. A person may use a self-service market device to initiate, process, and complete a transaction. In some cases, the self-service market device may verify information about the person before determining whether to allow the transaction.

SUMMARY

Disclosed herein are, inter alia, implementations of systems and techniques for platform-agnostic account access using facial recognition.

In an implementation, a processing and verification device is provided for facilitating transactions with a vending machine. The processing and verification device comprises a processor, an image sensor, a network interface, and a memory. The processor executes instructions for facilitating a transaction with the vending machine based on a request received from a user of the processing and verification device. The image sensor captures an image of a face of the user of the processing and verification device to process the request. The network interface determines whether a network connection to a server device is available, the server device storing online account information of the user of the processing and verification device. The memory stores the instructions. The instructions include instructions to: receive the request from the user of the processing and verification device; capture, using the image sensor, the image of the face of the user; responsive to the request, determine, using the network interface, that the network connection to the server device is unavailable; responsive to the determination that the network connection to the server device is unavailable, query a database stored at a back-up device associated with the processing and verification device for offline account information of the user of the processing and verification device; verify access to the offline account information using the captured image of the face of the user; responsive to the verification of the access to the offline account information, further process the request to facilitate the transaction with the vending machine including by storing data representative of the transaction within the database at the back-up device; after a completion of the transaction with the vending machine, determine, using the network interface, that the network connection to the server device is available; and transmit the data representative of the transaction to the server device to cause a reconciliation of the online account information.

In another implementation, a processing and verification device is provided for facilitating transactions with a vending machine. The processing and verification device comprises a processor, an image sensor, a back-up device, and a memory. The processor executes instructions for facilitating a transaction with the vending machine based on a request received from a user of the processing and verification device. The image sensor captures an image of a face of the user of the processing and verification device to process the request. The back-up device stores offline account information of the user of the processing and verification device. The memory stores the instructions. The instructions include instructions to: determine whether a network connection to a server device is available, the server device storing online account information of the user of the processing and verification device; responsive to a determination that the network connection to the server device is unavailable, verify access to the offline account information of the user of the processing and verification device using the captured image of the face of the user; responsive to the verification of the access to the offline account information, further process the request to facilitate the transaction with the vending machine including by storing data representative of the transaction at the back-up device; after a completion of the transaction with the vending machine, determine that the network connection to the server device is available; and transmit data representative of the transaction to the server device to cause a reconciliation of the online account information.

In yet another implementation, a processing and verification device is provided for facilitating transactions with a vending machine. The processing and verification device comprises a processor and a memory. The processor executes instructions for facilitating a transaction with the vending machine based on a request received from a user of the processing and verification device. The instructions include instructions to: verify access to offline account information of the user of the processing and verification device using facial recognition; responsive to verifying the offline access to the account information, further process the request to complete the transaction including by producing data representative of the transaction; and after the completion of the transaction, use a network connection to a server device to update online account information of the user of the processing and verification device according to the data representative of the transaction.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Upon receiving a request for a transaction from a user, a device of a connected system may determine whether to allow or deny the request based on the account information of the user. For example, the device may attempt to verify an identity of the user before allowing the request. A typical device may ask the user to enter a username and password combination to access his or her account information. In some cases, a device may allow a user to verify his or her identify using a mobile device, such as by two-factor authentication or the like.

However, these typical verification mechanisms can be inconvenient and time consuming. For example, in the context of a self-service market environment, users generally seek to minimize the time spent processing requests using self-service market devices. Furthermore, these typical verification mechanisms may fail or be unusable in certain situations, such as where a network connection to the device of the connected system becomes unavailable.

Implementations of this disclosure address problems such as these by using facial recognition to allow access to platform-agnostic account information. A processing and verification device receives a request for a transaction requiring access to account information of a user. Responsive to the request, a new image of the user is generated, such as using an image sensor of a camera. The new image is used to query a database to determine whether an existing image stored in the database matches or substantially matches the new image. Responsive to a positive result of the query, the request is allowed by the processing and verification device granting the access to the account information. The access to the account information is then used to complete the transaction. The account information uses a global architecture such that it can be used with different hardware and software configurations of a connected system. In cases where a network connection to a server device storing the account information is unavailable, offline account information stored in a back-up device associated with the processing and verification device is used to process the request for the transaction. Later, after the network connection to the server device becomes available, data representative of the transaction is used to cause a reconciliation of the online account information stored at the server device.

Figure 1:
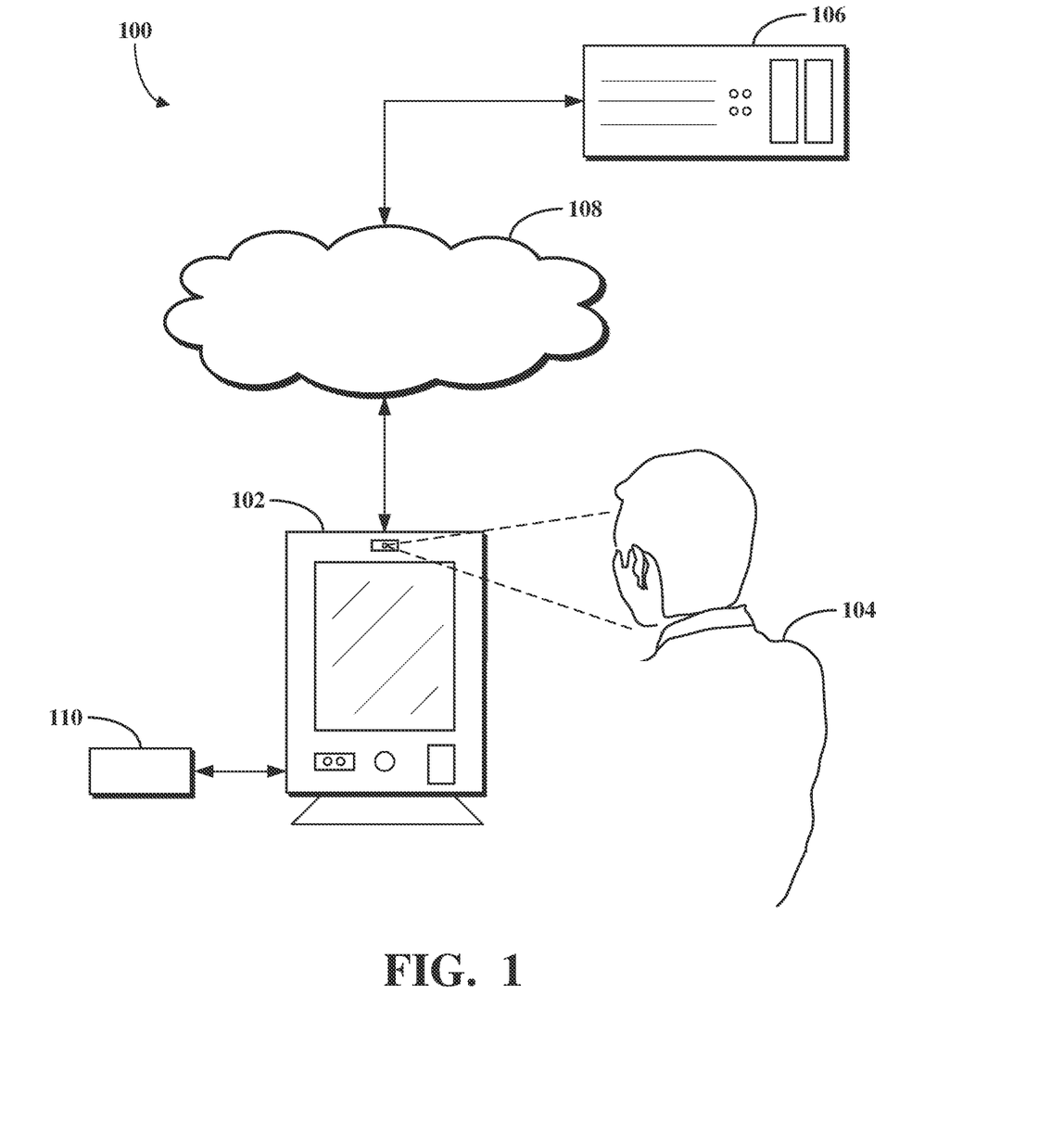
FIG. 1 is a block diagram of an example of a system for platform-agnostic account access using facial recognition.

To describe some implementations in greater detail, reference is first made to examples of hardware structures which may be used. FIG. 1 is a block diagram of an example of a system 100 for platform-agnostic account access using facial recognition. The system 100 includes a processing and verification device 102, which includes functionality for performing facial recognition against a user 104. The user 104 uses the processing and verification device 102 to initiate, process, and/or complete a transaction, for example, within a self-service market environment. The processing and verification device 102 uses facial recognition to verify the user 104, such as to allow the transaction to be initiated, processed, or otherwise completed.

For example, the user 104 may have an account with the self-service market environment. The user 104 can use the processing and verification device 102 to initiate a transaction for a product. As part of facilitating the transaction, the processing and verification device 102 can verify the identity of the user, or otherwise cause a verification of the identity of the user, such as in order to allow access to the account information of the user. For example, the account information of the user may include information identifying the user 104, information indicating payment options and/or an available credit balance for the user 104 (e.g., a stored value usable to cover a total cost value for the product), or other information usable to facilitate a transaction for the product. The processing and verification device 102 can use facial recognition to verify the user 104, such as to allow the account information to be used for the transaction.

The system 100 further includes a server device 106. The server device 106 is a computing device that hosts server-side application software and stores information used by the server-side application software and related application software (e.g., client-side application software running on the processing and verification device 102). The server device 106 may include an application server and/or a database server. The server device 106 may be a server located in a rack, such as of a data center. Alternatively, the server device 106 may represent a server within a same location as the processing and verification device 102.

The processing and verification device 102 communicates with the server device 106 over a network 108. The network 108 may, for example, be a local area network, a wide area network, a machine-to-machine network, a virtual private network, or another public or private network. For example, application software running on the processing and verification device 102 may be configured, deployed, or otherwise run on the processing and verification device 102 based on instructions, commands, or other data received from the server device 106 over the network 108.

The system 100 includes functionality for controlling a transaction wholly or partially processed at the processing and verification device 102 using facial recognition. In one example, the system 100 may refer to a system for processing transactions within a self-service market environment. The processing and verification device 102 may be a self-service market device, such as a kiosk device running point of sales software that uses stored value account data for the user 104 to control the initiation, processing, or completion of a transaction for goods of a vending machine, which, as is described below, may be, include, or refer to a conventional vending machine or other structures and/or forms. For example, the processing and verification device 102 may be a device that is physically or wirelessly coupled to a mechanical or computing aspect of a vending machine.

Application software running at the processing and verification device 102 causes an image sensor of the processing and verification device 102 to capture data indicative of a face of the user 104, such as by taking a picture of the user 104. The facial recognition functionality of the system 100 then include the processing and verification device 102 comparing the captured image to data stored in connection with an account or other record of the user 104 with the system 100. For example, the captured image can be compared to an existing image stored in connection with account information of the user 104. Subsequent to determining a match between those data, the application software allows the transaction to proceed. The transaction is initiated by a request received at the processing and verification device 102. The request may, for example, be received as input directly from the user 104 or from a mobile device of the user 104.

The processing and verification device 102 may include a storage component for storing data associated with the user 104, such as account information of the user 104. For example, the storage component may be a non-volatile memory as described below with respect to FIG. 2. The processing and verification device 102 may be configured to generate new data based on a transaction and store the new data within the storage component. For example, the processing and verification device 102 may store data indicating successful and/or unsuccessful attempts to initiate, process, or complete a transaction, such as based on results of the facial recognition functionality of the processing and verification device 102.

The account information of the user 104 may be, include, or otherwise refer to one or both of online account information of the user 104 or offline account information of the user 104. The server device 106 stores the online account information of the user 104. For example, there may be a number of processing and verification devices available to the user 104, which may use the same or different platforms to enable transactions to be initiated, processed, and completed. The server device 106 can maintain updated account information for the user 104 before and after each such transaction is performed at one of those available processing and verification devices. As such, the processing and verification device 102 receives data from the server device 106 over the network 108 before or during the processing of a request for a transaction. The processing and verification device 102 then transmits data to the server device 106 over the network 108 to cause the server device 106 to update the account information for the user 104 during or after the completion of the transaction.

For example, after the processing and verification device 102 receives a request for a transaction from the user 104, the processing and verification device 102 receives data indicative of the account information for the user 104 from the server device 106. The processing and verification device 102 may receive the data from the server device 106 responsive to a command transmitted to the server device 106 from the processing and verification device 102. Alternatively, a thread of the server device 106 that monitors the application software running at the processing and verification device 102 may determine to transmit the data. Other alternatives for the processing and verification device 102 receiving the data are also possible.

After the user 104 completes a current transaction at the processing and verification device 102, the processing and verification device 102 transmits data indicative of the transaction to the server device 106. The server device 106 then updates the account information for the user 104 based on the data transmitted from the processing and verification device 102. The data transmitted from the processing and verification device 102 may, for example, include data indicative of a total purchase amount for the transaction, a product associated with the transaction, a date and/or time of the transaction (e.g., for logging purposes), and/or more.

The processing and verification device 102 can communicate with a back-up device 110. The back-up device 110 stores the online account information of the user 104. For example, the back-up device 110 may be a storage device that backs up the online account information for the user 104 received from the server device 106 and as modified based on transactions processed at the processing and verification device 102. The back-up device 110 may be local with respect to the processing and verification device 102 such that the back-up device 110 and the processing and verification device 102 can communicate over a local connection. As such, the offline account information may represent the online account information in a manner which does not use a network connection to the server device 106.

Thus, upon or after receiving online account information for the user 104 from the server device 106, the processing and verification device 102 can transmit that received account information to the back-up device 110 for storage as offline account information. Additionally, upon or after completing a transaction, the processing and verification device 102 can transmit information indicative of the transaction to the back-up device 110.

In some cases, the processing and verification device 102 may be unable to communicate with the server device 106. For example, the network 108 may be unavailable, such as due to a power outage, network traffic, hardware or software malfunction, or another reason. In such an event, a network connection between the processing and verification device 102 and the server device 106 may be determined to be unavailable, and, upon the processing and verification device 102 receiving a request for a transaction from the user 104, the processing and verification device 102 retrieves the offline account information for the user 104 from the back-up device 110. Upon the completion of the transaction, the processing and verification device 102 then transmits the data indicative of the transaction to the back-up device 110, which updates the stored, offline account information for the user 104 according thereto.

In some implementations, the processing and verification device 102 can determine an unavailability of the server device 106, such as by pinging the server device 106. For example, the processing and verification device 102 can ping the server device 106 before or after a request for a transaction is received from the user 104. In some such implementations, the processing and verification device 102 receives the account information for the user 104 from the back-up device 110 responsive to the processing and verification device 102 determining the unavailability of the server device 106.

After the availability of the network 108 is restored, the processing and verification device 102 retrieves the updated account information for the user 104 from the back-up device 110. The processing and verification device 102 then transmits that retrieved updated account information to the server device 106. In the event of a data error (e.g., because the account information updated at the back-up device 110 did not match the account information stored at the server device 106), the server device 106 performs reconciliatory operations against the account information.

The account information stored at the server device 106 is globally accessible within a connected system including the processing and verification device 102. For example, a connected system may include multiple processing and verification devices located throughout one or more physical facilities. In some cases, the processing and verification devices of the connected system may use different platforms, such as based on the particular hardware and/or software configurations used thereby. The account information is platform agnostic in that it can be processed using each of the processing and verification devices of the connected system. As such, hardware and/or software configurations particular to ones of the processing and verification devices do not affect the ability of the server device 106 to send and receive the account information.

Implementations of the system 100 may differ from what is shown and described above with respect to FIG. 1. In some implementations, the back-up device 110 may be internal to the processing and verification device 102. In some implementations, the back-up device 110 may not communicate with the processing and verification device 102 when the network 108 is available. For example, absent a determination that the network 108 is unavailable, the processing and verification device 102 may not transmit data received from the server device 106 and/or generated or modified at the processing and verification device 102 to the back-up device 110. Upon or shortly after determining that the network 108 is unavailable, the processing and verification device 102 may transmit most recently known data for the account information to the back-up device 110. The back-up device 110 then processes offline transactions using that most recently known data.

In some implementations, the processing and verification device 102 may be a mobile device of the user 104. For example, the user 104 can use application software running on his or her mobile device to perform a transaction with a self-service market device. For example, the mobile device may be in wireless communication with the self-service market device, such as based on a connection established using the application software. In such an implementation, the facial recognition functionality of the system 100 may utilize a camera of the mobile device.

Figure 2:
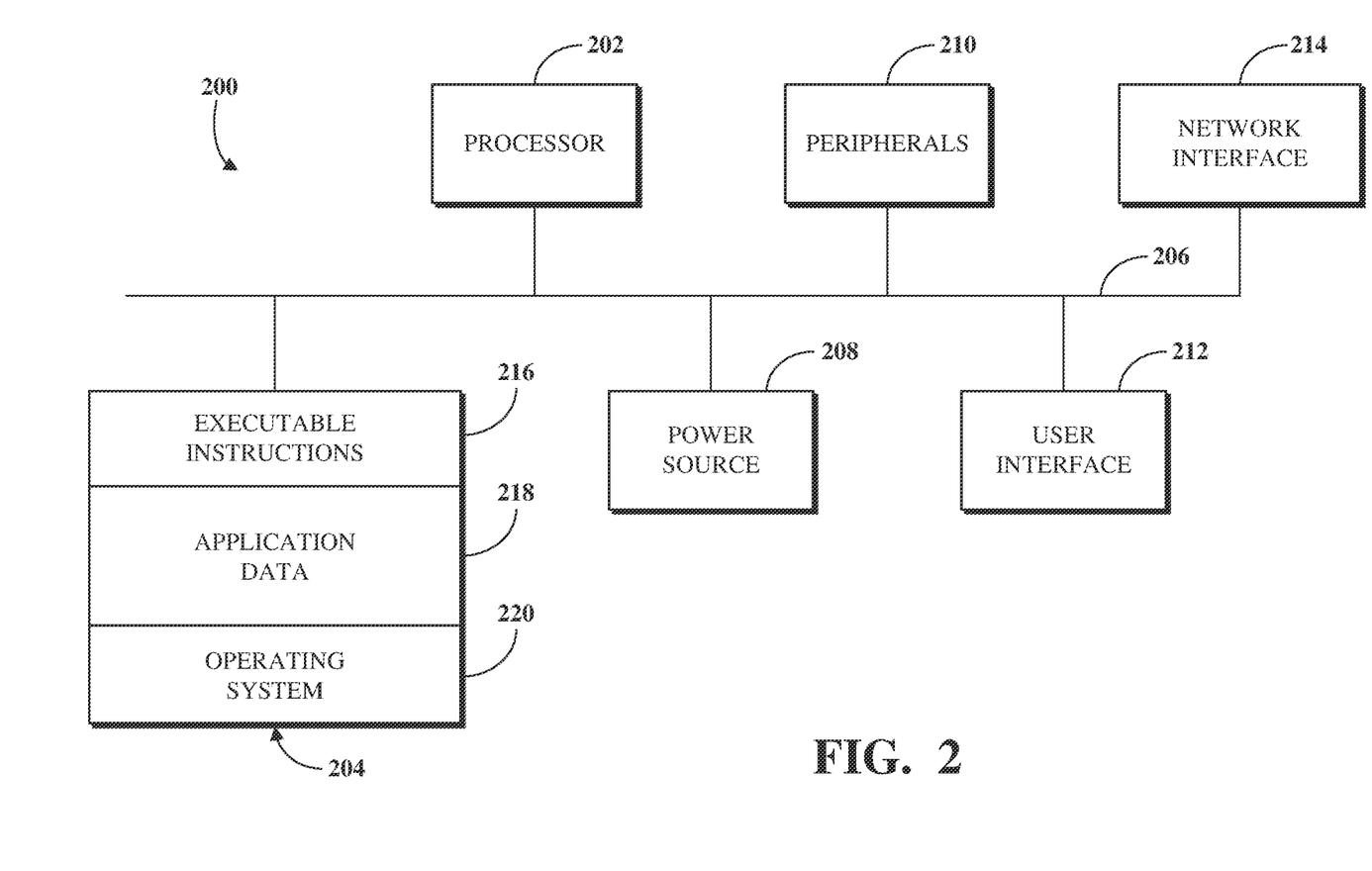
FIG. 2 is a block diagram of an example of an internal configuration of a computing device of a system for platform-agnostic account access using facial recognition.

FIG. 2 is a block diagram of an example of an internal configuration of a computing device 200 of a system for platform-agnostic account access using facial recognition, such as the system 100 shown in FIG. 1. The computing device 200 may, for example, be the processing and verification device 102, the server device 106, or the back-up device 110 shown in FIG. 1. The computing device 200 includes components or units, such as a processor 202, a memory 204, a bus 206, a power source 208, peripherals 210, a user interface 212, and a network interface 214. One of more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, now existing or hereafter developed, configured for manipulating or processing information. For example, the processor 202 can include multiple processors interconnected in any manner, including hardwired or networked, including wirelessly networked. For example, the operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory of the memory 204 can be random access memory (RAM) (e.g., a DRAM module, such as DDR SDRAM) or another form of volatile memory. In another example, the non-volatile memory of the memory 204 can be a disk drive, a solid state drive, flash memory, phase-change memory, or another form of non-volatile memory configured for persistent electronic information storage. The memory 204 may also include other types of devices, now existing or hereafter developed, configured for storing data or instructions for processing by the processor 202.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. The operating system 220 can be, for example, Microsoft Windows®, Mac OS X®, or Linux®; an operating system for a small device, such as a smartphone or tablet device; or an operating system for a large device, such as a mainframe computer.

The power source 208 includes a source for providing power to the computing device 200. For example, the power source 208 can be an interface to an external power distribution system. In another example, the power source 208 can be a battery, such as where the computing device 200 is a mobile device or is otherwise configured to operate independently of an external power distribution system.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network, for example, a local area network, a wide area network, a machine-to-machine network, a virtual private network, or another public or private network. The network interface 214 can be a wired network interface or a wireless network interface. The computing device 200 can communicate with other devices via the network interface 214 using one or more network protocols, such as using Ethernet, TCP, IP, power line communication, Wi-Fi, Bluetooth®, infrared, GPRS, GSM, CDMA, Z-Wave, ZigBee, another protocol, or a combination thereof.

Implementations of the computing device 200 may differ from what is shown and described above with respect to FIG. 2. In some implementations, the computing device 200 can omit the peripherals 210. In some implementations, the memory 204 can be distributed across multiple devices. For example, the memory 204 can include network-based memory or memory in multiple clients or servers performing the operations of those multiple devices. In some implementations, the application data 218 can include functional programs, such as a web browser, a web server, a database server, another program, or a combination thereof.

Figure 3:
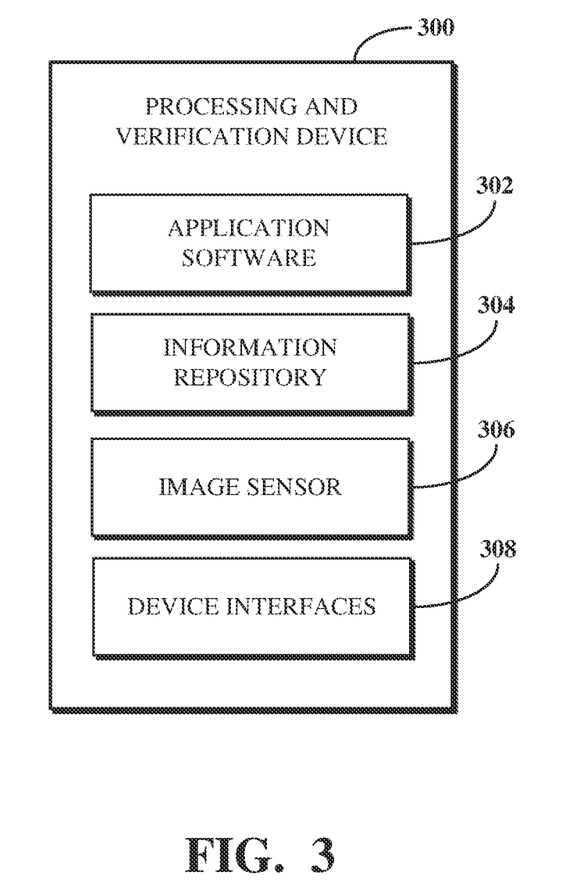
FIG. 3 is a block diagram of an example of software mechanisms of a processing and verification device.

FIG. 3 is a block diagram of an example of hardware and software components of a processing and verification device 300, which may, for example, be the processing and verification device 102 shown in FIG. 1. The hardware and software components of the processing and verification device 300 include application software 302, an information repository manager 304, an image sensor 306, and device interfaces 308.

The application software 302 is software for receiving and processing requests, such as requests to initiate, process, or complete a transaction. For example, the application software 302 may be software for facilitating transactions in connection with a user account of a market system including one or more processing and verification devices. The application software 302 may include point-of-sales functionality, such as to identify a product for a subject transaction (e.g., using an information look-up, scanning, or other mechanism), determine inventory information for the product, and/or verify user account information necessary for completing the subject transaction (e.g., using facial recognition).

The information repository manager 304 is a database software layer that communicates with a database or other data store in connection with the processing of a request, such as a request to initiate, process, or complete a transaction. For example, the database or other data store may be stored locally at the processing and verification device 300. In another example, the database or other data store may be stored remotely, such as at a server device (e.g., the server device 106 shown in FIG. 1). In yet another example, the database or other data store may be stored at a back-up device (e.g., the back-up device 110 shown in FIG. 1). The information repository 304 uses input parameters received from the application software 302 to query to database or other data store.

The image sensor 306 is a hardware component for measuring the intensity of light exposure, such as to capture an image. The image sensor 306 may be included in an image capture device. For example, the image sensor 306 may be an image sensor of a camera of the processing and verification device 300. The camera may, for example, be internal to the processing and verification device 300, such as a built-in camera. Alternatively, the camera may be external to the processing and verification device 300, such as using a wired or wireless connection. Other embodiments of the image sensor 306 are also possible. For example, the image sensor 306 may be an image sensor of a pinhole camera. For example, the pinhole camera can be built into the processing and verification device 300.

The device interfaces 308 may include software (e.g., drivers) used to interface hardware components of the processing and verification device 300 with hardware devices that may be external or internal to the processing and verification device 300. The device interfaces 308 may also or instead include hardware (e.g., physical ports and related circuitry) used to interface with the internal or external devices. For example, the device interfaces 308 can include a network interface and/or a driver, as necessary, for facilitating wired or wireless communications between the application software 302 and the image sensor 306. In another example, the device interfaces 308 may include circuitry and/or software for peripherals used by the processing and verification device 300, such as a barcode scanner, a funds dispenser, a biometric sensor, a card reader, or the like, or a combination thereof. For example, the processing and verification device 300 may include a peripheral for receiving credit for facilitating a transaction, such as from a credit card, gift card, or other source of the user.

For example, a request received by the application software 302 can include a request to initiate a transaction. Upon receiving the request, the application software 302 can use facial recognition (e.g., by generating a new image of the user inputting the request, such as using the image sensor 306) to verify the user of the processing and verification device 300, such as to allow access to the account information of the user. For example, the application software 302 can provide the new image generated using the image sensor 306 or data representative thereof as parameters to the information repository manager 304. The information repository manager 304 can use those parameters to query a database or other data store to verify the image or data before the application software 302 allows access to the user account.

Implementations of the software mechanisms of the processing and verification device 300 may differ from what is shown and described with respect to FIG. 3. In some implementations, the processing and verification device 300 may include facial recognition software separate from the application software 302. For example, the facial recognition software can receive the new image generated using the image sensor 306. The facial recognition software then processes the new image against existing images stored within the database or other data store accessible to the information repository 304 to determine whether to verify the user of the processing and verification device 300, such as to allow access to a requested user account.

In some implementations, the processing and verification device 300 may include a display. For example, the display can show information processed by the processing and verification device 300, such as based on a request received using the application software 302. In another example, such as where the display includes a touch screen, the display may be used to input the request to the processing and verification device 300. For example, the user of the processing and verification device 300 may select an option within the application software 302 to verify access to his or her user account using facial recognition. The selection then causes the image sensor 306 to generate the new image of the user.

Figure 4:
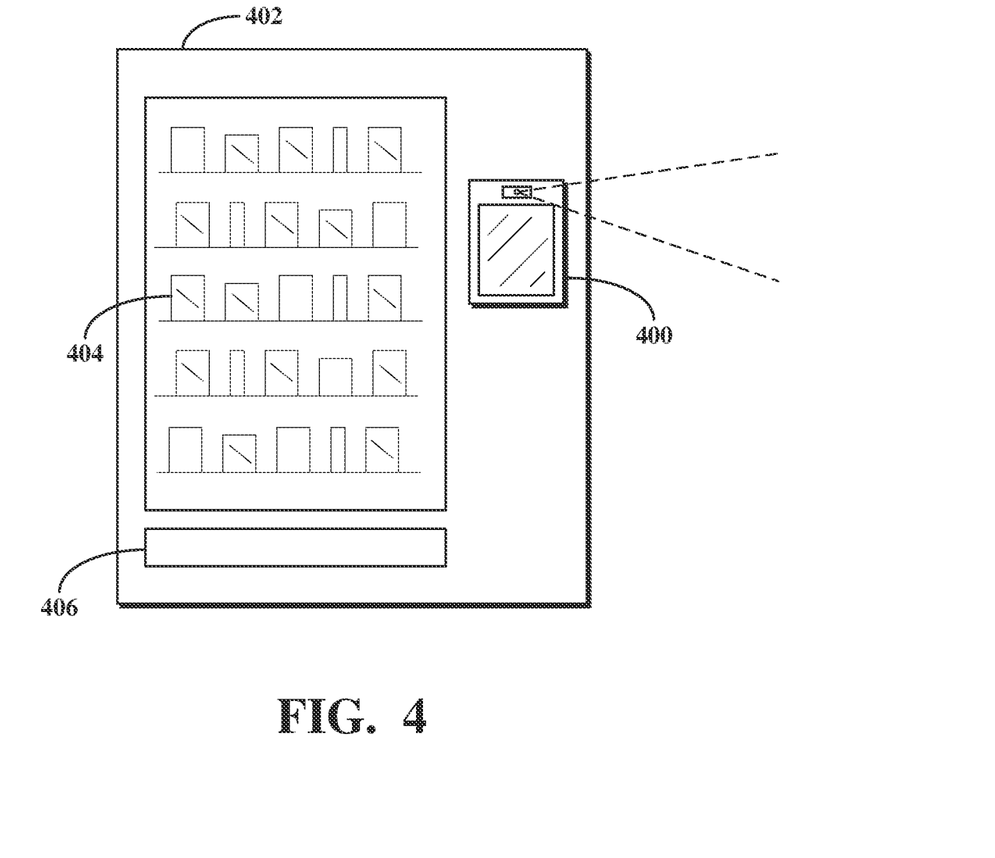
FIG. 4 is an illustration of an example of a processing and verification device coupled to a vending machine.

In some implementations, the image sensor 306 may be external to the processing and verification device 400. For example, the image sensor 306 may be an image sensor of a camera external to the processing and verification device 400, such as a camera proximate to the processing and verification device 400 and/or proximate to the vending machine 402. In some such implementations, the external image sensor may be in wireless communication with the processing and verification device 400. In some such implementations, the external image sensor may be in wired communication with the processing and verification device 400.

FIG. 4 is an illustration of an example of a processing and verification device 400 coupled to a vending machine 402. The processing and verification device 400 may, for example, be the processing and verification device 102 shown in FIG. 1 or the processing and verification device 300 shown in FIG. 3, to the extent different. Alternatively, the processing and verification device 400 may be a different device, such as a device specifically configured for use through coupling with a separate device or machine. The coupling between the processing and verification device 400 and the vending machine 402 (or other device or machine, as applicable) may be a physical connection, such as using a wired interface between ports thereof. Alternatively, the coupling between the processing and verification device 400 and the vending machine 402 (or other device or machine, as applicable) may be a wireless connection.

The processing and verification device 400 can use facial recognition to allow access to account information of a user of the vending machine 402. For example, the user may wish to obtain a product 404 available through the vending machine 402. The user can use the processing and verification device 400 to verify access to his or her account information by causing the processing and verification device 400 to perform facial recognition. Responsive to the processing and verification device 400 verifying the face of the user using facial recognition, the processing and verification device 400 transmits a command to the vending machine 402 or otherwise causes the vending machine 402 to release the product 404. The user can then retrieve the product 404, such as at a collection area 406.

As shown, the vending machine 402 is a conventional vending machine featuring products (e.g., the product 404) which may be obtained via the collection area 406 after a transaction is completed or as part of completing a transaction. However, the vending machine 402 may instead have other structures and/or forms. That is, in some implementations, the vending machine 402 may not vend and/or be or include a machine.

In some implementations, the vending machine 402 may be, include, or refer to a cabinet, drawer, shelf, cooler, freezer, pantry, or other display area or compartment which stores the product 404. In some such implementations, the product 404 may be retrieved from the vending machine 402 before, during, or after the processing of the request for the transaction involving it. For example, the vending machine 402 may store the product 404 without security aspects preventing the retrieval of the product 404 at some or all times.

In some such implementations, the vending machine 402 may be locked before a transaction using the processing and verification device 400 begins. Upon a verification of access to account information of the user of the processing and verification device 400, or upon further processing of a request for a transaction, the processing and verification device 400 may cause the vending machine 402 to unlock, such as to allow for a retrieval of the product 404 by the user from a storage element of the vending machine 402.

After the retrieval of the product 404 by the user, the vending machine 402 may become relocked. In some implementations, the relocking of the vending machine 402 may be automated by the vending machine 402. For example, the vending machine 402, such as at or proximate to the storage element from which the product 404 was retrieved, may include a sensor used to detect that the storage element has been closed or otherwise that the product 404 has been retrieved. For example, the sensor can be a magnetic open/close sensor, a weight/pressure sensor, or another sensor. The detection by the sensor can cause the vending machine 402 to automatically relock, such as without further intervention from the processing and verification device 400.

In some implementations, the relocking of the vending machine 402 may be caused by the processing and verification device 400. For example, responsive to the retrieval of the product 404 by the user from the vending machine 402, the processing and verification device 400 can transmit a request or command configured to cause the vending machine 402 to relock. For example, the request or command may be transmitted based on input received at the processing and verification device 400 from the user thereof, such as which input indicates that the user has completed the transaction. In another example, the request or command may be transmitted upon the detection, such as using a sensor at or proximate to a storage element from which the product 404 was retrieved, that the storage element has been closed or otherwise that the product 404 has been retrieved.

To further describe some implementations in greater detail, reference is next made to examples of techniques used by a system for request processing based on proximity detection. The techniques described herein can be executed using computing devices, such as included within or otherwise using the systems, software, and devices described with respect to FIGS. 1-4. The techniques described herein can be performed, for example, by executing a machine-readable program or other computer-executable instructions, such as routines, instructions, or programs described according to Java, JavaScript, C++, or other such routines or instructions. The steps, or operations, of the techniques described herein or any other technique, method, process, or algorithm described in connection with the implementations disclosed herein can be implemented directly in hardware, firmware, software executed by hardware, circuitry, or a combination thereof.

Although the techniques described herein are each shown as a series of operations for clarity, implementations of those techniques or any other method, technique, process, and/or algorithm described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

Figure 5:
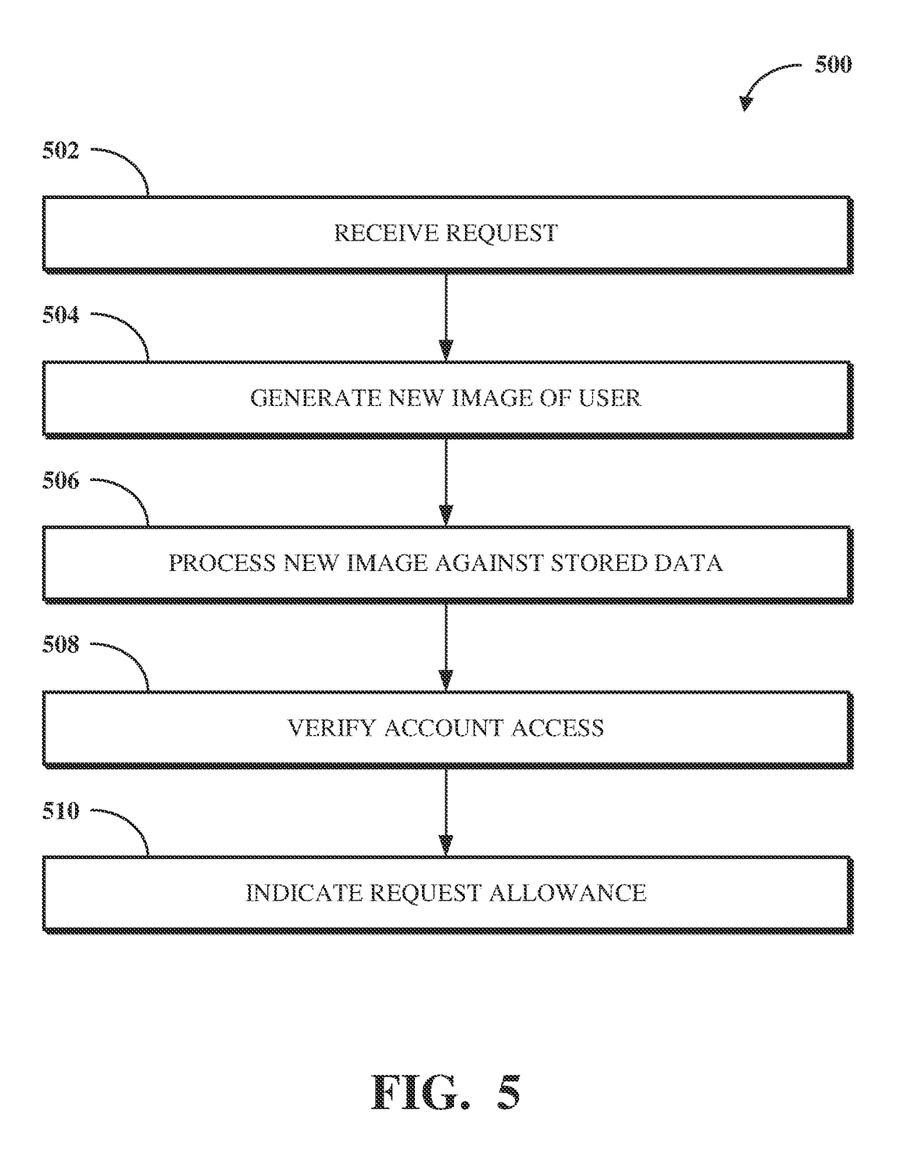
FIG. 5 is a flowchart illustrating an example of a technique for platform-agnostic account access using facial recognition.

FIG. 5 is a flowchart illustrating an example of a technique 500 for platform-agnostic account access using facial recognition. At 502, a request is received. The request is a request for a transaction requiring access to account information of a user. For example, the account information can be a stored value account or other account of a user of a self-service market device (e.g., the processing and verification device 102 shown in FIG. 1). The transaction may, for example, be a transaction for a product available using the self-service market device. The stored value account may be a platform-agnostic account usable with multiple processing and verification devices of a connected system including the self-service market device.

At 504, a new image is generated of the user responsive to the request. The new image is generated using an image sensor, which may, for example, be internal or external to the self-service market device. For example, the image sensor may be an image sensor of a camera built into the self-service market device. The camera may, for example, be a pinhole camera. Generating the new image using the image sensor includes the application software running at the self-service market device controlling the image sensor. For example, responsive to the request, the application software can generate a command to cause the image sensor to generate the new image, such as using a device interface of the image sensor.

At 506, the new image is processed against stored data. The stored data includes existing images stored within a database or other data store accessible to an information repository of the self-service market device. For example, the application software running at the self-service market device or other software (e.g., separate facial recognition software, to the extent used) can cause the information repository to query the database or other data store for an existing image that matches the new image generated using the image sensor.

The existing image may, for example, be an image previously captured using the image sensor or an image captured using a different image sensor and thereafter made available to the device running the application software (e.g., via that device itself or another device). For example, the existing image may be an image stored at one or more of the processing and verification device 102, the server device 106, or the back-up device 110 shown in FIG. 1.

In some implementations, the existing image may be stored at a mobile device of the user by the application software running on the processing and verification device. For example, as part of a process for processing a request received from the user, application software or other software running on the processing and verification device, which is in communication with the mobile device of the user, may transmit the image captured as part of that request processing to the mobile device for storage and later use (e.g., as an existing image in verifying an image later captured using the processing and verification device).

Querying the database or other data store includes comparing the new image or data representative thereof against the existing images or data representative thereof stored in the database or other data store. An information repository manager can be used to query for the existing image or other data. Alternatively, in some implementations, the information repository manager may be omitted. For example, the application software or other facial recognition software can instead directly query or otherwise search the database or other data store for a matching existing image.

Processing the new image can include communicating with an external device that stores the database or other data store. For example, processing the new image can include the application software running at the self-service market device transmitting a request to a server device. The request transmitted to the server device can include the query and the new image (or data representative of the new image, as applicable). Processing the new image can include checking for an available network connection before transmitting the request to the server device. In the event the network connection is unavailable, the new image can be processed offline. Implementations and examples for processing a new image offline as part of a request requiring access to account information of a user are described below with respect to FIG. 6.

At 508, responsive to a positive result of the querying, access to the account information of the user is verified. Verifying the account information access can include allowing the request, such as by allowing the requested transaction to be initiated, performed, and/or completed. If the account information access is verified at 508, the technique 500 proceeds to 510. However if the account information access is not verified at 508, the technique 500 may not proceed to 510. In some implementations, if the account information access is not verified at 508 during a first attempt, a second or subsequent attempt to verify the account information access may be made.

At 510, provided the account information access is verified at 508, the allowance of the request is indicated. For example, a display of the self-service market device can show that the transaction has been initiated, such as by outputting data indicating the initiation of the transaction to a graphical user interface. In another example, where the self-service market device interfaces with a vending machine (e.g., as shown in FIG. 4), the allowance of the request can be indicated by causing the vending machine to release a selected vending item. The selection of the vending item can be indicated by the request or subsequent to the request.

In some implementations, the operations for receiving the request can be omitted. For example, the new image of the user can be generated automatically, such as by the application software of the processing and verification mechanism determining that a face of a user has entered a view region of an image sensor. For example, the application software may be configured to continuously monitor a particular region of space in front of the processing and verification device for faces. Upon determining that a face is positioned within that particular region for more than a threshold duration (e.g., more than one or two seconds), the application software can control the image sensor to generate the new image automatically, such as without manual user input.

Figure 6:
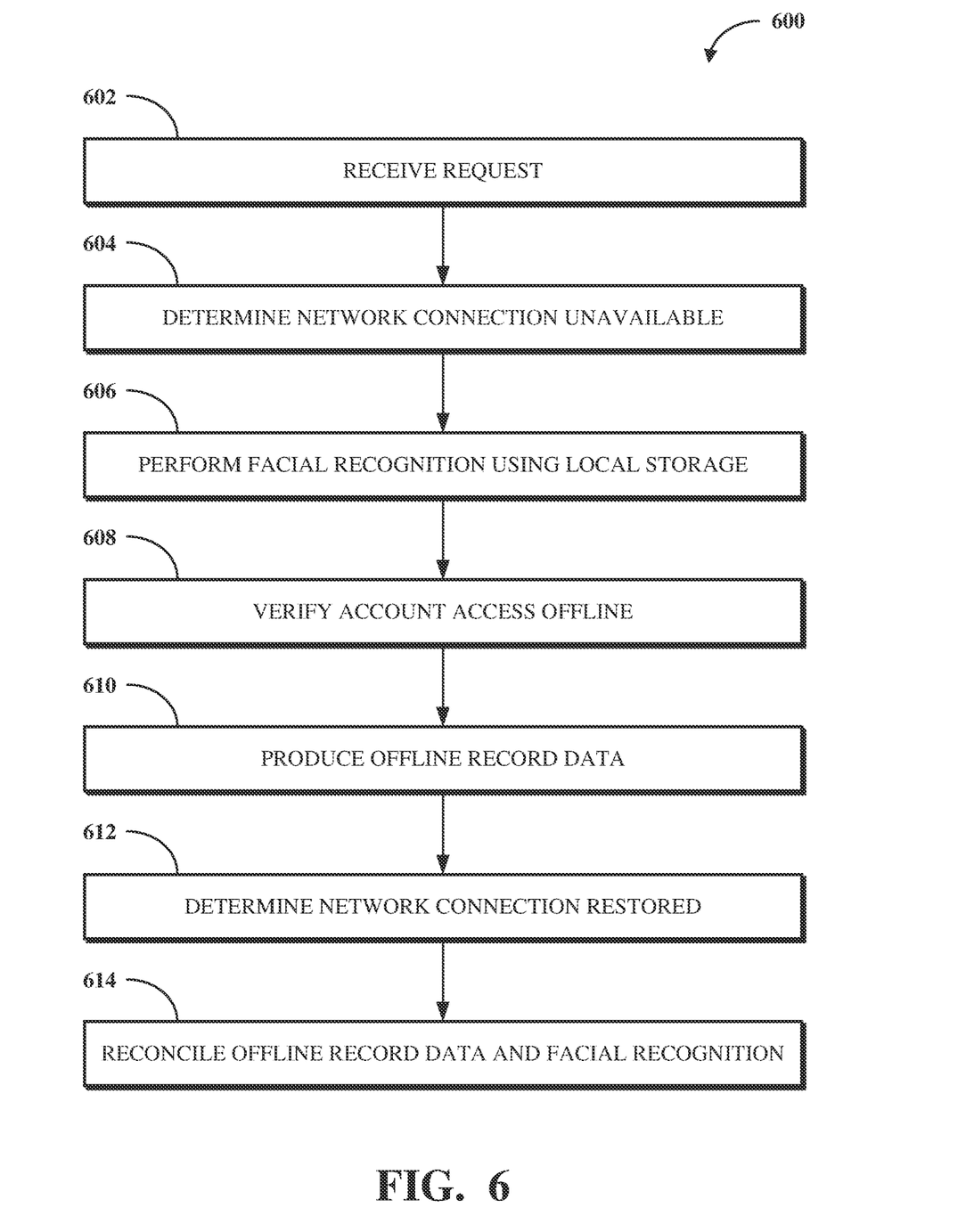
FIG. 6 is a flowchart illustrating an example of a technique for reconciliation of offline account accesses using facial recognition.

FIG. 6 is a flowchart illustrating an example of a technique 600 for reconciliation of offline account accesses using facial recognition. At 602, a request is received. Implementations and examples for requests and receiving requests are further described above with respect to FIG. 5. At 604, a determination is made that a network connection is unavailable. Determining that the network connection is unavailable can include determining whether a network interface of the processing and verification device identifies an available network connection. Alternatively, where a network interface of the processing and verification device identifies an available network connection, determining that the network connection is unavailable can include determining that a network connection to a server device running application software used in connection with the processing and verification device is unavailable.

Responsive to determining that the network connection is unavailable (e.g., because the processing and verification device cannot connect to a network and/or because the processing and verification device cannot connect over a network to a server device running the application software), facial recognition is performed using a local storage of the processing and verification device. The local storage may, for example, be a storage device of the processing and verification device or a back-up device internal or external to the processing and verification device. The local storage includes records of existing images associated with user accounts of the connected system that includes the processing and verification device.

Performing the facial recognition using the local storage of the processing and verification device includes generating a new image of a face of a user of the processing and verification device, such as using an image sensor of the processing and verification device. The new image is then compared against the existing images stored within the local storage. In the event a match is identified, a positive result is returned. Implementations and examples for performing facial recognition are further described above with respect to FIG. 5.

Responsive to the positive result being returned for the facial recognition, at 608, the access to the account information is verified such that the request is allowed. At 610, offline record data is produced. The offline record data is indicative of the transaction allowed based on the facial recognition. For example, the offline record data can reflect one or more of a total value cost for a product or products transacted for, specific information about the product or products transacted for, a date and/or time of the completion of the transaction, or the like.

At 612, sometime after the offline record data is produced, a determination is made that the network connection is restored. The determining that the network connection is restored can be performed in substantially the same way as the earlier determination that the network connection is unavailable (e.g., by using a network interface of the processing and verification device).

At 614, after determining that the network connection is restored, the offline record data and data associated with the facial recognition performed responsive to the request are reconciled against online records for the account information. For example, reconciling the offline record data against the online records can include reducing a stored value of account information of a user according to a total cost value for the transaction. In another example, where the reconciliation reflects that such stored value was insufficient to cover such total cost value, reconciling the offline record data can include transmitting a request for the remaining balance to the user or fulfilling the remaining balance using a value source of record (e.g., a credit card, a bank account, etc.).

Reconciling the facial recognition information can include comparing the new image and/or the matched existing image against the existing image stored online (e.g., at a server device, for example, the server device 106 shown in FIG. 1) for the account information. For example, if the locally stored existing image is old (e.g., such that an age threshold has been met), the reconciling can include replacing the existing image with the new image. For example, the connected system and/or the individual processing and verification device can include a policy for requiring that existing images used for the facial recognition be updated every so often (e.g., once per year). The age threshold is met where the existing image was generated longer ago than permitted by the policy.

In some implementations, responsive to a determination that an existing image stored online does not meet the age threshold, the existing image may be culled. Culling the existing image may include deleting the existing image from a database of the server device and/or from a database of a back-up device. In some such implementations, where an existing image of a processing and verification device seeks to initiate a new transaction, the processing and verification may check to determine whether the existing image is stored at the server device and/or at the back-up device. Responsive to a determination that the existing image is not stored, such as because it was previously culled, the processing and verification device may cause the user to store a new image at the server device and/or at the back-up device before initiating the transaction. For example, the processing and verification device may direct the user to use a mobile application on his or her mobile device to capture a new image and to then cause that new image to be stored at the server device and/or at the back-up device.

In some implementations, determining whether the network connection is unavailable can include checking whether a network connection to a defined connected system or device of a connected system is unavailable. For example, the network may be a local network of a connected system that includes one or more processing and verification devices. The local network may include the server device that stores the existing image and other data for accessing account information of users.

In some implementations, verifying the account access offline can include verifying that the account information includes a stored value necessary for processing the requested transaction. For example, the transaction may be a transaction for a product available through a self-service market device. The request may thus be a request to purchase that product. Verifying the account access offline can include determining, based on most recent records for the account information, whether a stored value associated with the account information includes at least a total cost value for the product. Responsive to determining that the stored value does not include at least the total cost value, the request can be denied, such as even where the facial recognition is successfully performed.

The implementations of this disclosure can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "mechanism," "module," or "monitor" as used herein and in the figures may be understood as corresponding to a functional unit implemented using software, hardware (e.g., an integrated circuit, such as an ASIC), or a combination of software and hardware. In certain contexts, such mechanisms, modules, or monitors may be understood to be a processor-implemented software mechanism, processor-implemented software module, or software-implemented monitor that is part of or callable by an executable program, which may itself be wholly or partly composed of such linked mechanisms, modules, or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While this disclosure has been described in connection with certain implementations, it is to be understood that this disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An apparatus, comprising:
 a memory; and
 a processor configured to execute instructions stored in the memory to:
  determine, based on a purchase transaction request associated with a device user, that access to online account information of the device user is unavailable;
  verify, based on the unavailability of the online account information, access to offline account information of the device user using an image of a face of the device user;
  process, based on the verification, the purchase transaction request using the offline account information, wherein the processing of the purchase transaction request results in an adjustment to a stored value of the offline account information; and
  cause a reconciliation of the online account information based on the adjustment to the stored value.

2. The apparatus of claim 1, comprising a camera, wherein the processor is configured to execute the instructions to:
 capture, using the camera, the image of the face of the device user based on the determination that the online account information is unavailable.

3. The apparatus of claim 2, wherein the processor is configured to execute the instructions to:
 monitor, using the camera, a region of space in front of the apparatus,
 wherein the camera captures the image of the face of the device user based on the face of the device user being detected within the region of space for more than a threshold duration.

4. The apparatus of claim 1, wherein the offline account information includes an existing image of the face of the device user, and wherein, to verify the access to the offline account information, the processor is configured to execute the instructions to:
 determine whether to allow access to the stored value based on a comparison between the image of the face of the device user and the existing image of the face of the device user.

5. The apparatus of claim 1, comprising:
 a lockable portion configured to unlock based on the processing of the purchase transaction request; and
 a sensor configured to:
  detect a completion of a transaction associated with the purchase transaction request; and
  cause the lockable portion to automatically relock based on the completion of the transaction.

6. The apparatus of claim 5, comprising:
 a display configured to show information associated with the transaction.

7. The apparatus of claim 1, wherein, to determine that access to the online account information is unavailable, the processor is configured to execute the instructions to:
 determine that a network connection to a server device at which the online account information is stored is unavailable.

8. The apparatus of claim 1, wherein, to process the purchase transaction request, the processor is configured to execute the instructions to:
 determine whether the stored value include at least a total cost for one or more products associated with the purchase transaction request; and
 deny the purchase transaction request based on a determination that the stored value does not include at least the total cost.

9. The apparatus of claim 1, comprising:
 a back-up device configured to store the offline account information,
 wherein, to process the purchase transaction request, the processor is configured to execute instructions to:
  access the offline account information within the back-up device.

10. A method, comprising:
 determining, based on a purchase transaction request associated with a device user, whether a network connection to a server device that stores online account information of the device user is available;
 verifying, based on a determination that the network connection to the server device is unavailable, access to offline account information of the device user using an image of a face of the device user; and
 processing the purchase transaction request using a stored value of the offline account information.

11. The method of claim 10, comprising:
 capturing the image of the face of the device user based on the determination that the network connection to the server device is unavailable.

12. The method of claim 10, wherein processing the purchase transaction request comprises:
 causing a vending machine to release a selected vending item associated with the purchase transaction request.

13. The method of claim 12, wherein processing the purchase transaction request comprises:
 causing the vending machine to unlock to permit a retrieval of the selected vending item; and
 causing the vending machine to re-lock based on the retrieval of the selected vending item.

14. The method of claim 10, wherein the purchase transaction request is received from a mobile device associated with the device user.

15. The method of claim 10, comprising:
 causing a reconciliation of the online account information based on an adjustment made to the stored value by the processing of the purchase transaction request.

16. The method of claim 10, wherein verifying access to the offline account information further comprises:
 determining whether a stored value associated with the offline account information includes at least a total cost value for the product.

17. A method, comprising:
 verifying, based on access to online account information of a device user being unavailable, access to offline account information of the device user using facial recognition; and
 processing, based on a successful verification of the access to the offline account information, a purchase transaction request associated with the device user using the offline account information.

18. The method of claim 17, wherein verifying the access to the offline account information using facial recognition comprises:
 capturing a new image of a face of the device user; and
 comparing the new image against an existing image of the face of the device user.

19. The method of claim 17, comprising:
causing a reconciliation of the online account information based on an adjustment made to a stored value of the offline account information by the processing of the purchase transaction request.

20. The method of claim 17, comprising:
causing a lockable device to unlock based on the processing of the purchase transaction request.

* * * * *